Sept. 23, 1969  G. M. ROBERTSON ET AL  3,468,026
CONTINUOUS CHEESEMAKING PROCESS
Filed May 15, 1967  5 Sheets-Sheet 2

INVENTORS
George M. Robertson
George K. Charles
BY De Lio and Montgomery
ATTORNEYS

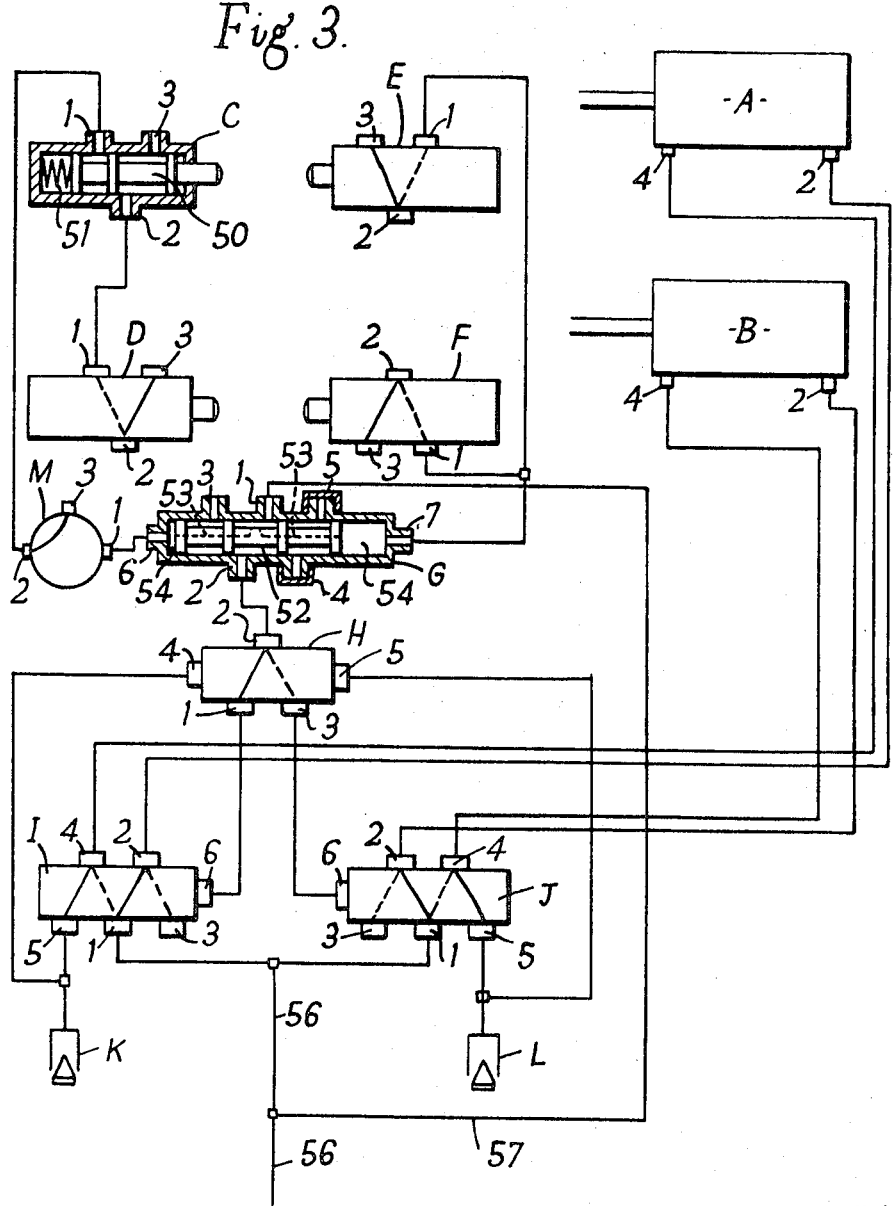

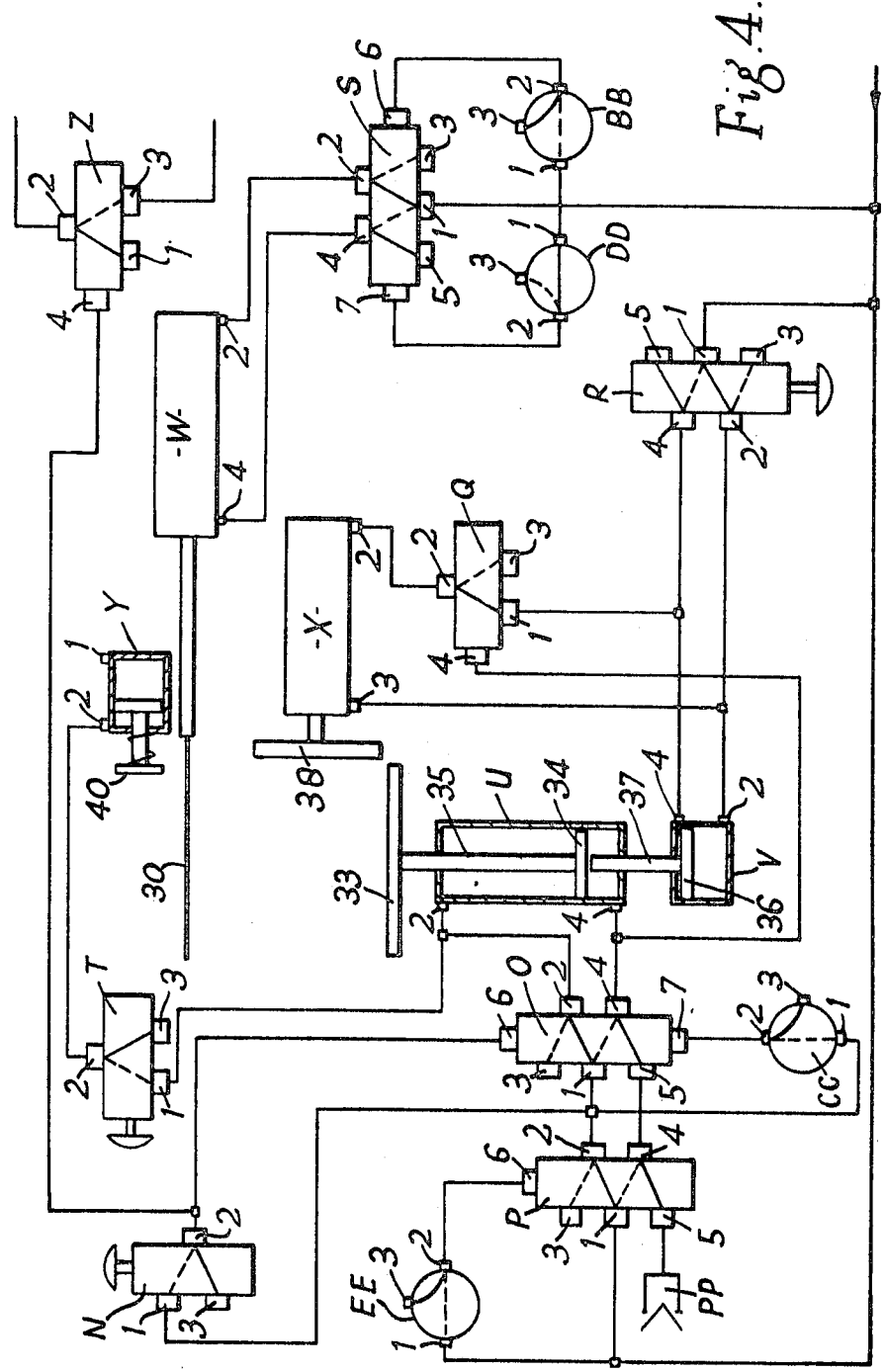

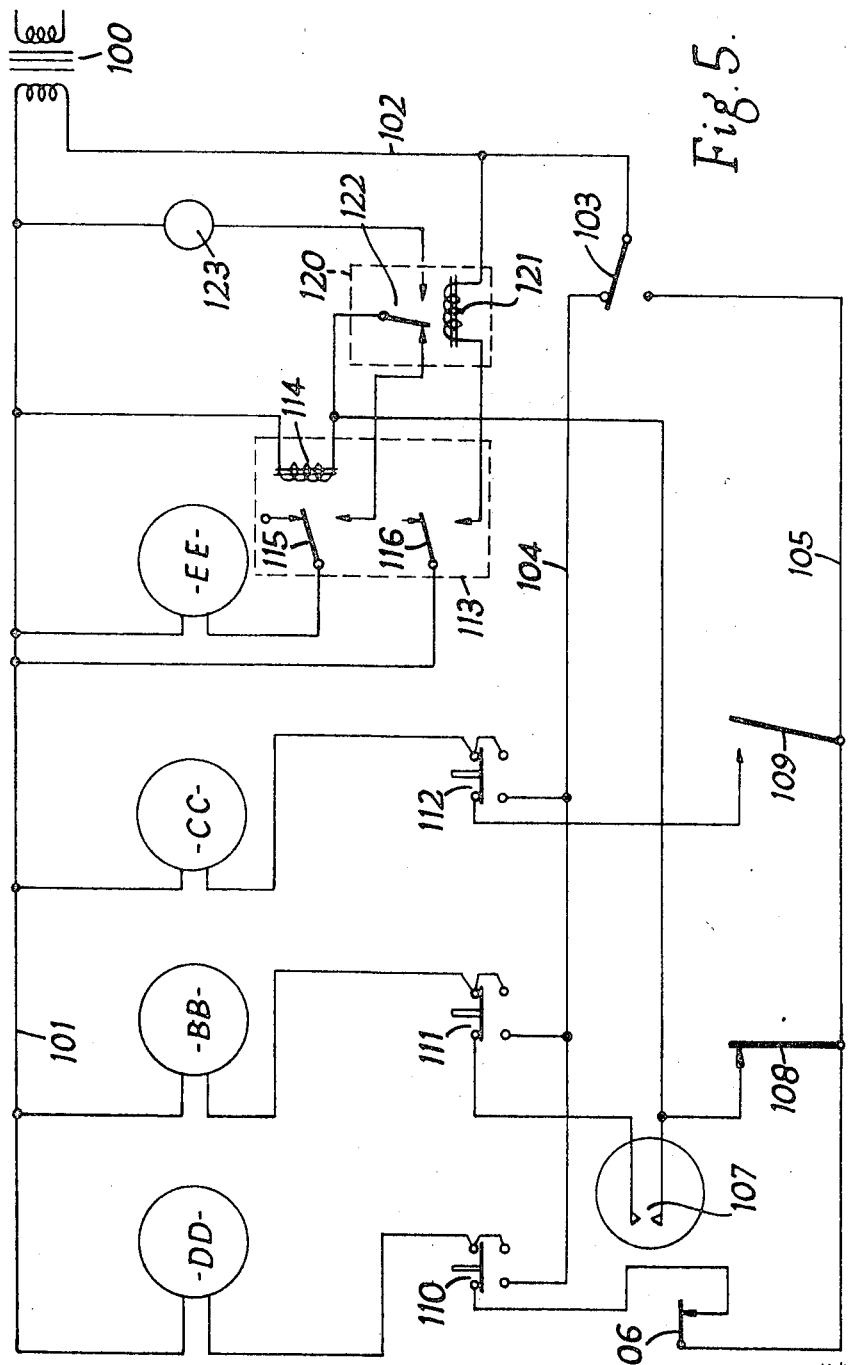

3,468,026
CONTINUOUS CHEESEMAKING PROCESS
George M. Robertson and George K. Charles, Guildford, Surrey, England, assignors to Cow & Gate Limited, Guildford, Surrey, England
Filed May 15, 1967, Ser. No. 638,236
Claims priority, application Great Britain, May 17, 1966, 21,940/66
Int. Cl. A01j 25/12, 25/00, 27/00
U.S. Cl. 31—89      18 Claims

ABSTRACT OF THE DISCLOSURE

A method of continuously making cheese in which a stream of crumbled curd is fed into a chamber to form a pillar or rod of curd which is passed through the chamber, the curd being compressed in the pillar or rod, and blocks of cheese are severed from the pillar or rod as it emerges from the chamber. The chamber is preferably maintained at a sub-atmospheric pressure to extract air from the crumbled curd fed into the chamber. The curd may be compressed either by the weight of superimposed curd in a pillar of the curd, or by forcing the curd into a duct leading to an extrusion nozzle which is blanked off during the compression of the curd in the duct.

---

This invention relates to cheesemaking, and is concerned more particularly with the formation of blocks of compressed natural cheese from cheese curd.

An increasing volume of cheese is being manufactured commercially by crumbling cheese curd in a mill, mixing the curd with salt, compressing the prepared curd to expel whey and air and cause the particles of curd to fuse together and form a block of natural cheese, wrapping the block in impervious sheet material, and then maturing the cheese under pressure. Previously the prepared cheese curd has been formed into blocks of natural cheese by compressing the curd in individual moulds, but the filling, weighing, compressing and emptying of each mould is a time-consuming operation, and a large number of moulds and presses are required for large scale production.

The object of the invention is to provide a method of continuously making cheese from crumbled cheese curd.

The method according to the invention comprises forming the crumbled curd into a pillar in a chamber maintained at a sub-atmospheric pressure so that the curd in the lower portion of the pillar is compressed by the weight of superimposed curd to press out whey therefrom, removing the whey from the chamber, feeding crumbled curd into the chamber and onto the top of the pillar, lowering the pillar in the chamber and severing the lower end of the pillar to form a block of curd, and then further compressing the block of curd removed from the pillar to form cheese.

The absolute pressure in the chamber would depend on the variety of cheese being made and the closeness of the body of the cheese. By the use of a suitable low pressure within the chamber, almost all the air can be removed from the curd before it is compressed into the pillar or rod, so that the blocks of cheese will be free of air pockets.

The blocks of cheese manufactured by the method of the invention are in a condition suitable to be wrapped in impervious sheet material and matured under pressure. It is, of course, to be understood that the crumbled curd has previously been mixed with salt and any other desired additive, and the term curd is used hereinafter to denote the mixture used for making cheese.

Apparatus for carrying out the method of the invention will now be described, by way of example, with reference to the accompanying drawings, in which:

FIGS. 3 and 4 are diagrams of pneumatic control circuits.

FIG. 5 is a diagram of the electric circuit, and

Figure 1:
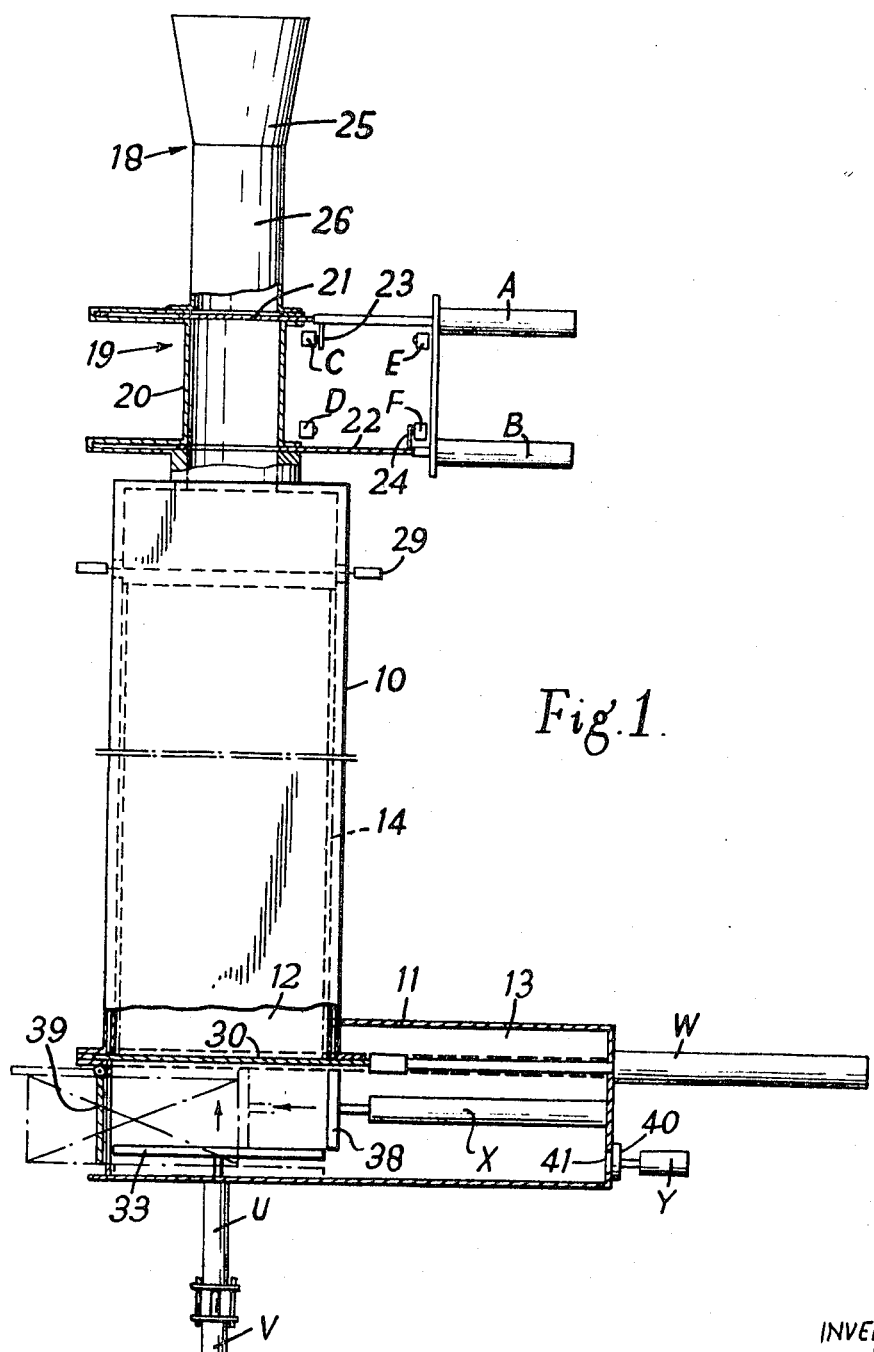
FIG. 1 is an elevation view of one form of apparatus partially cut away to show details of the construction.
Figure 2:
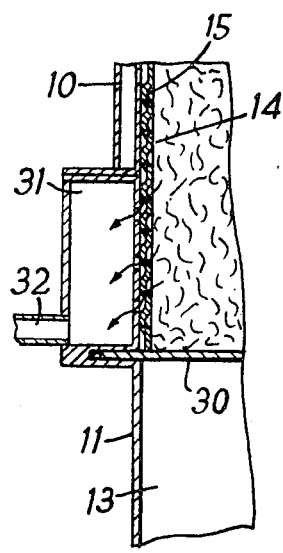
FIG. 2 is a sectional view on a larger scale of part of the apparatus of FIG. 1.

The apparatus shown in FIGURES 1 and 2 comprises a double-walled hollow casing 10 of rectangular section mounted vertically on a hollow casing 11, the lower end of the casing 10 being open and projecting through the top wall of casing 11. The interior of the casing 10 forms an upper vacuum chamber 12 and the interior of casing 11 forms a lower vacuum chamber 13. A thin-walled tubular column 14 of rectangular section is mounted in the upper chamber 12 with its lower end level with the bottom of the upper chamber and its upper end spaced from the top of the upper chamber, the walls of the column 14 being perforated and co-operating with the casing 11 to form therebetween a space for drainage of liquid. The walls of the column 14 can conveniently be made of thin aluminium alloy sheets 15 secured to the inside wall of the casing 10, each sheet having small elongated strips punched out of the plane of the sheet to form two narrow slits on each side of each strip with the ends of the strips merging smoothly into the body of the sheet. Such strips may be approximately ⅜ of an inch long and ¹⁄₁₆ of an inch wide with the strips spaced ⅝ of an inch apart in rows, the strips in each row being staggered relative to the strips in the adjacent row. The sheets are arranged so that the strips are vertical and project from the outside surfaces of the sheets. The inside surfaces of the walls of the column 14 are thus smooth and unobstructed by any inwardly extending projections, and the strips space the body of the sheet from the casing 10 to provide the drainage space. Such perforated sheets are of known construction.

The upper end of the casing 10 is provided with a feed hopper 18 and an air lock 19 between the outlet of the hopper and the vacuum chamber 12. The air lock consists of a tubular duct 20 and upper and lower slide valves 21, 22 operable in succession to permit cheese curd to drop from the hopper into the upper chamber 12 while maintaining a vacuum in the upper chamber. Each slide valve comprises a steel valve plate movable between two layers of nylon sandwiched between opposite walls of a casing, the layers of nylon and the casing being rectangular and having circular apertures in registered with duct 20, and the valve plate also being rectangular and movable between a closed position in which it blanks off the duct and an open position in which a circular aperture in the valve plate is in register with the duct 20. The valve 21 is operable by a pneumatic cylinder A and has an arm 23 arranged to operate control valves C and E at opposite ends of its stroke. Similarly, the slide valve 22 is operable by a pneumatic cylinder B and has an arm 24 arranged to operate control valves D and F at opposite ends of its stroke.

The hopper 18 comprises a funnel 25 mounted on the upper end of a duct 26 aligned with and having a length greater than the tubular duct 20. Cheese curd fed into the hopper thus forms a cylindrical plug in the duct 26, the plug sliding into the duct 20 when the upper slide valve 21 is moved into the open position. This construction prevents blockage of the upper end of the air lock by a mass of cheese curd which might occur if the funnel was mounted directly on the upper end of the duct 20.

A guillotine blade 30 is mounted in guides on the lower end of the casing 10, within the chamber 13, for sliding movement between a closed position in which it seals off the upper chamber 12 from the lower chamber 13, and an open position in which it is withdrawn wholly clear of the lower end of the upper chamber. The outer end of the blade 30 is provided with a sharp edge and acts as a guillotine which slices through the lower end of a pillar of cheese extending from the column 14 into the lower chamber 13, when the blade is moved from its open to its closed position. The guillotine blade is movable between its open and closed positions by a pneumatic cylinder W mounted on the outside of the casing 11.

The lower end of the casing 10 is fitted on opposite sides with drainage manifolds 31 (FIG. 2) communicating with the space between the casing 11 and the perforated plates forming the walls of the column 14, the manifolds having an outlet 32 for extracting air from the upper chamber 12 and liquid expressed from the cheese curd in the column 14.

The casing 10 is also fitted with a photoelectric device 29 arranged to direct a beam of light across the upper end of chamber 12 and onto a cell providing a signal whenever the pillar of curd in the upper chamber extends above the upper edge of column 14.

The lower chamber 13 is provided with a platform 33 positioned directly below the column 14. The platform can be raised or lowered by two vertical cylinders U and V arranged in tandem. As shown in FIGURE 4, cylinder U has a piston 34 secured to a piston rod 35 projecting through the upper end of the cylinder and supporting the platform 33, and the cylinder V has a piston 36 secured to a piston rod 37 which projects into the lower end of cylinder U. When the piston 36 is in its fully raised position, the platform 33 is movable by cylinder U between a fully raised position in which it is immediately below the blade 30 and a lower position in which piston 34 abuts against piston rod 37. When the piston of cylinder V is in its bottom position, the platform can be lowered further for clearance purposes.

The lower chamber 13 is also provided with an ejector 38 operable by a cylinder X to eject a block of cheese on the platform 33 out through a hinged access door 39. The lower chamber is air-tight when the access door is closed, as is also the upper chamber when the guillotine blade 30 is in its closed position, and suitable pumping mechanism is provided to extract air from the two chambers to provide a high vacuum therein. A release valve 40 is movable away from an opening 41 in the casing of the lower chamber by a pneumatic cylinder Y to release the vacuum in the lower chamber when a block of cheese is to be removed therefrom.

In an operational cycle of the apparatus, a tray is placed on the platform 33, the access door 39 is closed, the guillotine blade 30 is moved to its closed position closing off the lower end of chamber 12, and air is extracted from the two chambers 12, 13. Cheese curd, which has previously been crumbled in a mill and mixed with salt, is then fed into the hopper 18 and the slide valves 21, 22 in the air lock are automatically opened and closed alternately to allow the curd to pass from the hopper into the upper chamber and fall into the column 14. Some of the moisture in the curd vaporises immediately it enters the upper chamber due to the subatmospheric pressure therein. The cheese curd accumulates on the blade 30 at the bottom of the column and builds up into a pillar within the column. The weight of curd in the column compresses the curd at the lower end and forces whey out of the curd, the whey passing through the slits in the walls of the column into the space between the column 14 and casing 10 and the whey then draining into the manifolds 31 from which it is continuously extracted by a pump.

When the column 14 is almost filled with cheese curd, the platform 33 is raised to a position in which the tray is immediately below the blade 30 and the blade is then withdrawn so that the pillar of cheese within the column slides down inside the column and on to the tray on the platform. With the piston 36 (FIG. 4) of cylinder V in its upper position, the platform together with the pillar of curd is lowered by piston 34 to a position in which the latter piston abuts against the piston rod 37. The blade 30 is then driven into its closed position, thereby severing a block of cheese from the lower end of the cheese pillar. Although the cheese in the block has been compressed by the weight of the superimposed curd in the column, the cheese block is compressed further by forcing the platform upwards and compressing the block against the underside of the blade 30. The cheese can thus be compressed to any desired degree by use of a suitable size of cylinder and operating pressure for the air.

After compressing the cheese block for a predetermined time (for example 30–60 seconds), the piston 34 together with the platform is lowered until it abuts the piston rod 37, and the piston 36 and rod 37 are then lowered so as to lower the platform a clearance distance and thereby space the top of the block from the guillotine blade 30. The valve 40 is then withdrawn by cylinder Y to admit air into the lower chamber through opening 41, and the tray carrying the block of cheese is removed through the access door 39 by ejector 38 driven by cylinder X. The ejector is then retracted, a fresh tray placed on the platform, the door closed and the cycle repeated. During subsequent cycles the vacuum in chamber 12 remains substantially constant and only the vacuum in chamber 13 need be released at the end of each cycle to remove the compressed block of cheese.

The temperature of the cheese curd in the column 14 may be raised by injecting hot air into the space between the inner and outer walls of the double-walled casing 10, or by heating the casing 10 by means of steam coils surrounding the casing.

FIGURE 3 illustrates the pneumatic circuit for operating automatically the upper and lower slide valves 21, 22, and FIGURES 4 and 5 illustrate the pneumatic and electric circuits for operating the guillotine blade 30, platform 33 and ejector 38. The pneumatic circuits include pressure-applied or pressure release operated valves shown in side elevation, for example valves C and G, and electric solenoid operated valves shown end-on, for example valve M, each valve comprising a cylindrical body and a valve plunger axially movable in the body between two setting positions in each of which different ports in the body are interconnected. Such valves are well known in the art and only valves C and G have been shown in section to illustrate their operation. For convenience, each of the valves in the drawings is identified by a letter of the alphabet and each port identified by a numeral, a port of a particular valve being identified by both letter and numeral, and the paths between the ports are indicated by full lines in one setting position of the plunger and by dotted lines in the other setting position.

In FIGURE 3, the valves C, D, E, F have a plunger 50 biased by an internal spring 51 to a first position providing a path between ports 2 and 3, the plungers being movable against the action of the spring into a second position providing a path between ports 1 and 2. Valves C and E are operable by slide valve 21 and valves D and F by slide valve 22 as explained previously. Valve G has a plunger 52 provided with axial ducts 53 for feeding pressurised air at port 1 to cylinders 54 at opposite ends of the valve body whereby, upon exhaust of air from one cylinder 54, the pressure of air in the other cylinder forces the plunger towards the opposite end of the valve body. The ports 4 and 5 in valve G are sealed. Valve H has a plunger axially movable between ports 4 and 5 at opposite ends of the valve body, whereby supply of pressurised air alternately to the two ports moves the plunger between its two setting positions. Valves I and J have a plunger biased by an internal spring towards an end of the valve valves are then de-energised except DD and the plungers of the spring loaded valves are in their spring-biased positions. Pressurised air thus flows through R1, R2 and into the cylinder V through port 2, holding the piston of cylinder V at the top of its stroke with its piston rod extending through the lower end of cylinder U. Pressurised air also flows through P1, P2, O1, O2 and into cylinder U through its port 2, holding the piston 34 of the cylinder U against the piston rod 37 of cylinder V. The upward force exerted by the piston 36 is greater than the downward force exerted by the piston 34 due to the reduction in piston area caused by the presence of the piston rod 35 on the upper end of the piston 34. The ejector 38 is held fully retracted by the pressurised air fed through R1, R2 and port 3 of cylinder X.

To commence another cycle the control knob of valve N is depressed manually to establish the dotted line path between ports 1 and 2, thereby directing pressurised air to port 6 of valve O and driving the plunger of this valve downwards to establish the dotted line paths shown. Air from port 7 of valve O exhausts through CC2, CC3. Pressurised air then flows through P1, P2, O1, O4 to port 4 of cylinder U, causing its piston and the platform 33 to rise. Air displaced from the cylinder U exhausts to atmosphere through O2, O3. Pressurised air at port 4 of valve O also flows to port 4 of valve Q and moves its plunger to a position connecting ports 2 and 3. Port 2 of cylinder X is then connected to exhaust through ports Q2, Q3. Valve Q thus acts as an interlock which ensures that ejector 38 can only be extended when platform 33 is in its lowest position. Upward movement of the platform opens switch 106, thereby de-energising the solenoid of valve DD and establishing a path between its ports 2 and 3. Operation of the valve N also directs pressurised air to port 4 of valve Z, moving its plunger to the position providing the dotted line connection between ports 2 and 3.

Port 2 of valve Z is connected to the vacuum gauge coupled to switch 107 and port 3 of valve Z is connected to the lower vacuum chamber 13. Thus, while N is manually depressed and pressurised air supplied to port 4 of valve Z, the vacuum gauge is connected to the lower vacuum chamber 13. Provided that the vacuum in chamber 13 has reached a predetermined level, the vacuum gauge closes the contacts of switch 107, thereby energising the solenoid of valve BB to establish a path between ports 1 and 2 of this valve. Pressurised air then flows through valve BB to port 6 of valve S, moving the plunger of valve S towards port 7 and establishing the paths shown in dotted lines. Pressurised air then flows through S1, S4 to port 4 of cylinder W, thereby causing retraction of the guillotine blade 30. Air displaced from the cylinder W exhausts through S2, S3. The pillar of cheese then drops onto platform 33.

When the guillotine blade 30 reaches its fully open position, it closes the contacts of switch 109, thereby energising the solenoid of valve CC and establishing a path between ports 1 and 2 of this valve. Pressurised air then flows through P1, P2, CC1, CC2 to port 7 of valve O, causing its plunger to move towards port 6 and establish the paths shown in full lines. Pressurised air then flows through O1, O2 to enter the cylinder U through port 2, forcing its piston and the platform 33 downwards. Air displaced from the cylinder U flows through O4, O5, P4, P5 and exhausts gradually to atmosphere through an adjustable needle valve PP providing a controlled descent of the platform.

The platform 33 closes the contacts of switch 106 when it reaches the bottom of its stroke, thereby energising the solenoid of valve DD and establishing a path between its ports 1 and 2. Pressurised air then flows through valve DD to port 7 of valve S, causing its plunger to move towards port 6 and establish the full line paths shown. Pressurised air then flows through S1, S2 to enter port 2 at cylinder W and move the guillotine blade to its closed position, severing a block of cheese from the lower end of the pillar of curd.

When the guillotine blade is in its fully closed position it closes the contacts of switch 108 and completes the circuit through the holding coil 114 of the relay. Energisation of the coil 114 closes the contacts of switches 115, 116 thereby energising the solenoid of valve EE and energising the coil 121 to start the timer motor. Energisation of the solenoid of valve EE establishes a path between its ports 1 and 2 so that pressurised air flows through this valve to port 6 of valve P moving its plunger downwards to establish the paths shown in dotted lines. Pressurised air then flows through P1, P4, O5, O4 to enter port 4 of cylinder U, causing the platform 33 to rise and compress the block of cheese against the underside of the guillotine blade 30. At the end of the predetermined time cycle, the timer motor actuates the two-way switch 122 to open the circuit through the solenoid of valve EE and establish a circuit through the indicator lamp 123. De-energisation of the solenoid of valve EE establishes a path between its ports 2 and 3 and the air sustaining the plunger of valve P against the action of its spring exhausts through valve EE. The plunger of valve P is moved by its spring towards port 6 and establishes the paths shown in full lines. Pressurised air then flows through P1, P2, O1, O2 to enter port 2 of cylinder U and lower the platform 33. The completion of the circuit through lamp 123 indicates to an operator that the block of cheese is ready for removal from the lower vacuum chamber 13.

In order to release the vacuum in the lower chamber 13, the control knob of manual valve T is depressed to establish the path between its ports 1 and 2. Pressurized air then flows through P1, P2, O1, O2, T1, T2 to enter port 2 of cylinder Y causing its piston to retract the valve 40 and thereby connect the chamber 13 to atmosphere. The door of chamber 13 is then opened and the control knob of valve R depressed to establish the paths shown in dotted lines. Pressurised air then flows through R1, R4 to port 4 of cylinder V, forcing its piston to the bottom of its stroke. Air displaced from the cylinder V exhausts through R2, R3. The piston of cylinder U follows up the movement of the piston of cylinder V due to pressurised air supplied through its port 2. Pressurised air also flows through R1, R4, Q1, Q2 to enter port 2 of cylinder X. The ejector 38 is then driven outwards and slides the block of cheese off the platform 33. Air displaced from cylinder X exhausts through R2, R3.

Figure 6:
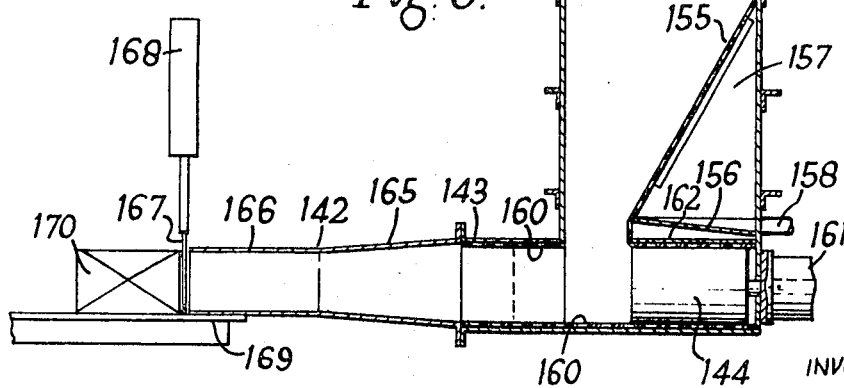
FIG. 6 is a part sectional elevation view of another form of the apparatus.

The apparatus shown in FIGURE 6 comprises a hollow column 140, the interior of which forms a vacuum chamber, feed mechanism 141 mounted on the top of the column and adapted to feed crumbled cheese curd into the column, an extrusion nozzle 142 mounted on an outlet duct 143 extending horizontally from the bottom of the front wall of the column, and a ram 144 for forcing the cheese curd through the nozzle.

The feed mechanism comprises a hopper 145 having a cylindrical outlet tube 146 extending through the top wall of the column 140, a plunger rod 147 extending vertically through the hopper and outlet tube and fitted with upper and lower lands 148, 149 which are a close sliding fit in the outlet tube, and a piston 150 mounted in a cylinder 151 on the top of the hopper. The piston and cylinder are arranged to reciprocate the plunger rod between an upper position in which the upper land 148 is spaced from the top of the outlet tube 146 and a lower position in which the lower land 149 is spaced from the bottom of the outlet tube. In the upper position of the plunger, cheese curd in the hopper can flow into the outlet tube between the two lands and in the lower position the curd between the two lands is free to fall into the column 140. The lands are spaced apart a distance slightly less than the length of the outlet tube so that one or other of the lands always seals the interior of the column from the hopper.

The column 140 is of rectangular section and the outlet body having a port 6, whereby pressurised air at port 6 forces the plunger towards the opposite end of the body against the action of the spring. Valve M is an electric solenoid operated valve energised by the photoelectric device 29 so as to connect ports 1 and 2 when the curd is below the level of the light beam, and to connect ports 2 and 3 when the curd interrupts the light beam. Ports 1 of valves G, J, I are fed with a supply of air under pressure through lines 56, 57.

At the start of a cycle of the feed mechanism the piston rods of cylinders A, B are fully extended with their contact arms 23, 24 depressing the plungers of valves C and D so that ports 1 and 2 of each of these valves are interconnected, the solenoid of valve M is energised so that its plunger provides a path between its ports 1 and 2 (assuming of course that the level of curd in the column 14 is below the light beam of the photoelectric device), and the plunger of valve H is in its left-hand position adjacent port 4 and providing a path between ports 1 and 2. Port 6 of valve G then exhausts to atmosphere through ports M1, M2, C1, C2, D1, D2 and the piston of valve G moves towards port 6 and provides a path through its ports 1 and 2. Pressure air fed to port G1 then passes through G1, G2, H2, H1 and enters port 6 of valve I to force its spring loaded plunger away from port 6 and into a position providing the paths shown in dotted lines. Pressure air fed to port 1 of valve I then enters cylinder A at port 4 and retracts the piston rod away from valve C. Air displaced from the cylinder A passes out of port 2 and exhausts to atmosphere through ports 2 and 3 of valve I.

When the piston rod of cylinder A is fully retracted, its contact arm 23 depresses the plunger of valve E to provide a path through ports E1, E2, and port 7 of valve G exhausts to atmosphere through valve E. The plunger of valve C has returned to its initial setting position under the action of its spring and the plunger of valve G is moved towards port 7 under the influence of the air under pressure fed to the left-hand end of the plunger, thereby connecting ports G2 and G3. The plunger of valve H is still in its left-hand position adjacent port 4 and the air sustaining the plunger of valve I against the action of its return spring exhausts freely through ports H1, H2, G2, G3. The plunger of valve I then moves towards ports 6 under the action of its return spring, establishing the paths shown in full lines. Pressure air fed to port 1 of valve I then enters cylinder A at port 2 to extend its piston rod. Air displaced from cylinder A passes out of its port 4 through ports 4 and 5 of valve I and exhausts to atmosphere through a needle valve K. The back pressure developed ahead of the valve K is transmitted to port 4 of valve H and moves the plunger of valve H towards port 5 thereby interconnecting its ports 2 and 3.

When the piston rod of cylinder A is fully extended, its contact arm 23 depresses the plunger of valve C so that port 6 of valve G exhausts to atmosphere through M1, M2, C1, C2, D1, D2 and the pressure of air fed to the right-hand end of valve G forces its plunger towards port 6. The path through valve G is then through ports 1 and 2 and air under pressure fed to port 1 of valve G flows through H2, H3 and into port 6 of valve J, thereby forcing its plunger away from port 6 and establishing the paths shown in dotted lines. Air under pressure fed to port 1 of valve J then enters cylinder B at port 4 and retracts its piston rod. Air displaced from the cylinder B passes out of its port 2 and exhausts to atmosphere through J2, J3.

When the piston rod of cylinder B is fully retracted, its contact arm 24 depresses the plunger of valve F to provide a path through its ports 1 and 2. Port 7 of valve G then exhausts to atmosphere through valve F and the plunger of valve G is moved towards port 7 to provide a path through its ports 2 and 3. The plunger of valve H is still adjacent port 5, interconnecting ports H2 and H3. Air sustaining the piston of valve J against its compression spring exhausts through ports J6, H3, H2, G2, G3 allowing the plunger of valve J to return towards port 6 under the action of its return spring and establish the paths shown in full lines. Air under pressure fed to port 1 of valve J then enters cylinder B at port 2 and extends its piston rod. Air displaced from cylinder B passes out of its port 4 and exhausts to atmosphere through ports J4, J5 and a needle valve L. The back pressure developed ahead of valve L is transmitted to port 5 of valve H and moves the plunger of valve H towards port 4, establishing a path between ports 1 and 2 of valve H. When the piston rod of cylinder B is fully extended its contact arm 24 depresses the plunger of valve D to complete the cycle.

In FIGURE 4, the valves N, R, T have a plunger biased by an internal spring to a first position providing the paths shown in full lines, the plunger being movable by hand against action of the spring into a second position providing the paths shown in dotted lines. Valves Q and Z are similar to valve N except that their plungers are movable into the second position by air pressure at port 4. Valve P is similar to valve R except that its plunger is movable into the second position by air pressure at port 6. Valves O, S have a plunger axially movable by air pressure at port 6 into one position providing the paths shown in dotted lines, and axially movable by air pressure at port 7 into another position providing the paths shown in full lines. Valves BB, CC, DD, EE, are electric solenoid operated valves having a plunger biased by a spring into a first position providing a path between ports 2 and 3, the solenoid when energised moving the plunger into a second position providing a path between ports 1 and 2.

In FIGURE 5, the valve solenoids are identified by the same reference letters as their corresponding valves in FIGURE 4. The electric circuit comprises a transformer 100, lines 101, 102 connected to the output terminals of the transformer, a two-way switch 103 for connecting a line 104 to line 102 for manual operation or line 105 to line 102 for automatic operation. Switch 106 is connected in series with solenoid DD across lines 101, 105 and has normally open contacts arranged to be closed in response to movement of the platform 33 into its lower position. Switches 107, 108 are connected in series with solenoid BB across lines 101, 105. Switch 107 has normally open contacts and is coupled to a vacuum gauge arranged to close the contacts when the vacuum in the lower vacuum chamber 13 is of a predetermined value. Switch 108 has normally open contacts which are closed in response to movement of the guillotine blade 30 into the closed position sealing off the upper vacuum chamber 12. Switch 109 is connected in series with solenoid CC across lines 101, 105 and has normally open contacts which are closed in response to movement of the guillotine blade 30 into its open or fully retracted position. Switches 110, 111, 112 are manually operable to connect solenoids DD, BB, CC respectively to line 104 for independent operation of the solenoids when switch 103 is set to manual control. A relay 113 has a coil 114 connected between switch 108 and line 101 and two switches 115, 116 having normally open contacts which are closed by an armature in coil 114 upon energisation of the coil. Switch 115 is connected to line 101 through the solenoid EE, and switch 116 is connected direct to line 101. A timer 120 has a coil 121 connected to line 102 and switch 116, the coil 121 being arranged to start a timer motor when the contacts of switch 116 are closed. The timer 120 also includes a two-way switch 122 normally biased to a position connecting contacts of switch 115 in series with switch 108 but movable into a second position connecting an indicator lamp 123 in a series with switch 108 and across lines 101, 105.

FIGURE 4 shows in full lines the paths provided through the various valves at the end of a cycle after ejection of a block of cheese and retraction of the ejector 38 into the lower vacuum chamber 13. All the solenoid duct 143 is of square section, the two side walls of the column tapering inwardly towards the bottom of the column so that the sides of the outlet duct are flush with the sides of the column at the bottom thereof. The lower portion of the column is fitted with two partitions 155, 156 which co-operate with the rear and side walls of the column to form a drainage compartment 157. The partition 155 is inclined downward and forwards so as to direct curd passing down the column towards the outlet duct 143, and this partition is perforated to permit air and moisture from the curd to pass into the drainage compartment 157. The partition 156 is unperforated and inclined downwards and rearwards to direct liquid in the compartment towards an outlet 158. The column is fitted with strengthening hoops 159, and the wall of the column may be heated by steam coils or other means to prevent chilling of curd in the column. Suitable pumping mechanism is provided to extract air from the column to maintain a high vacuum therein, and to extract whey through the outlet 158.

The bottom of the column 140 and the inside walls of the duct 143 are lined with perforated aluminium alloy sheets 160 as described in connection with the construction of the walls of the column 14 of the apparatus of FIGURES 1 and 2, and the ram 144 is of square section and is a close sliding fit in the lining of the outlet duct 143. The ram is movable by a piston and cylinder unit 161 from a retracted position below a cover plate 162 to an extended position in which it extends from below the cover plate and into the outlet duct 143. The cover plate prevents curd lodging at the rear of the ram and obstructing retraction of the ram.

The extrusion nozzle 142 is of rectangular section and has a tapering portion 165 which is connected to the outer end of the outlet duct 143 and a straight portion of constant cross section and a length slightly greater than the length of the desired block of cheese. The wall at the rear end of the tapering portion 165 of the nozzle is flush with the lining in the outlet duct 143.

A vertical guillotine blade 167 is provided at the mouth of the nozzle and is movable vertically by a cylinder 168 between a closed position in which the blade seals the mouth of the nozzle and an open position in which it is withdrawn wholly clear of the mouth of the nozzle. The front end of the nozzle is mounted on a table 169 adapted to receive a block of cheese 170 severed by the guillotine blade from cheese extruded through the nozzle.

In operation, the guillotine blade 167 is set in its closed position, the ram 144 is fully retracted below its cover plate, air is extracted from the interior of the column to provide a high vacuum therein, and crumbled cheese curd is fed from the hopper 145 into the column by reciprocating the plunger rod 147 as previously explained. Some of the moisture in the curd evaporates immediately it enters the column due to the sub-atmospheric pressure therein. The cheese curd accumulates within the column and builds up to a pillar. The weight of curd compresses the curd at the lower end and forces whey out of the curd, the whey passing through the openings in the partition 155 into the drainage compartment 157 from which it is continuously removed. Whey also passes through the openings in the alloy sheets 160 forming the lining to the bottom of the column and the outlet duct 143 and is drained away from the space between the body of these sheets and the bottom wall of the column.

The ram is then continuously reciprocated by the piston and cylinder unit 161 so as to force the curd into the nozzle, fresh curd dropping down in front of the ram each time the ram is moved into its retracted position. When the nozzle is completely filled with curd the ram compresses the curd in the nozzle to any desired degree against the guillotine blade 167. Any whey remaining with the curd passes through the openings in the alloy sheets 160 forming the lining of the outlet duct 143. The taper on portion 165 of the nozzle also has the effect of compressing the curd as it passes through the nozzle. The guillotine blade 167 is then raised clear of the mouth of the nozzle, the ram reciprocated to expel a mass of cheese of a length equal to that of the desired cheese block, and the blade lowered to sever off a block 170 of cheese. During the extrusion operation, the cheese in the nozzle provides a seal preventing entry of air into the column. The cycle is then repeated by reciprocating the ram and forcing fresh curd from the column into the nozzle until the pressure on the curd in the nozzle has reached the desired value.

In the operation of the apparatus described and illustrated in FIGURES 1–5 or FIGURE 6, cheese curd is preferably fed in a steady stream into the hopper by the apparatus described and claimed in our co-pending British patent specification No. 1,069,081. Moreover, the cheese blocks formed by the apparatus of the present invention are preferably matured by wrapping each block in flexible sheet material which is substantially impervious to air or moisture, and compressing the wrapped block between rigid panels which are brought together in compressing the cheese block to form a rigid-walled container which completely closes the cheese block, as described and claimed in our British patent specification No. 937,441.

We claim:

1. A method of continuously making cheese from crumbled cheese curd, comprising forming the crumbled curd into a pillar in a chamber maintained at a sub-atmospheric pressure so that the curd in the lower portion of the pillar is compressed by the weight of superimposed curd to press out whey therefrom, removing the whey from the chamber, feeding crumbled curd into the chamber and onto the top of the pillar, lowering the pillar in the chamber and severing the lower end of the pillar to form a block of curd and then further compressing the block of curd removed from the pillar to form cheese.

2. A method as claimed in claim 1, wherein the pillar is lowered so that its lower end passes into a second chamber below the first-mentioned chamber, the lower end of the pillar is severed from the remainder of the pillar by a guillotine blade forming a valve sealing off the first chamber from the second chamber, and the block of curd severed from the pillar is further compressed by forcing it upwards against the guillotine blade.

3. A method as claimed in claim 2, wherein the pillar of curd is lowered by a platform supporting the weight of the pillar, and the block of curd is further compressed by moving the platform upwards to force the block of curd against the guillotine blade.

4. A method as claimed in claim 3, including subsequently lowering the platform so as to space the compressed block of curd from the guillotine blade, raising the pressure in the second chamber to atmospheric pressure, removing the block of curd from the second chamber, evacuating the second chamber to said sub-atmospheric pressure, raising the platform to a position directly below the guillotine blade, and withdrawing the guillotine blade to support the pillar of curd on the platform.

5. A method as claimed in claim 1, wherein the block of curd severed from the pillar is fed into an extrusion nozzle forming part of said chamber, the mouth of the nozzle is closed and the curd in the extrusion nozzle is further compressed to form cheese by forcing it toward the closed mouth of the extrusion nozzle, and the mouth of the nozzle is subsequently opened, the cheese extruded therethrough and the extrudate severed to form blocks of cheese.

6. A method as claimed in claim 5, wherein the lower end of the pillar of curd is severed by a reciprocating ram and forced by said ram into a duct leading to the extrusion nozzle, the compression of the curd in the nozzle being effected by said ram.

7. A method as claimed in claim 6, wherein the duct is provided with a perforated lining for drainage of whey compressed out of the curd.

8. A method as claimed in claim 5, comprising closing the mouth of the extrusion nozzle by a guillotine blade used for severing the blocks of cheese from the extrudate.

9. A method as claimed in claim 5, including extruding the compressed curd through a nozzle wherein said nozzle has a portion tapering in the direction towards the mouth of the nozzle, the tapering portion effecting a further compression of the curd during its flow along the nozzle.

10. Apparatus for continuously making cheese from crumbled cheese curd, comprising a hollow column, a slide valve extending across and closing the lower end of the column, means for evacuating air from the column to maintain a sub-atmospheric pressure therein, means for introducing crumbled cheese curd into the upper end of the column at said sub-atmospheric pressure to form a pillar of curd therein supported on said slide valve, at least part of the wall of the lower end portion of the column having apertures for passage of whey pressed out from the lower end portion of the pillar of curd due to the weight of curd superimposed thereon, means operable to move said slide valve into an open position to permit the pillar of curd to slide down the column and then return the slide valve into the closed position to sever a block of curd from the lower end of the pillar, anl means operable to compress further said block of curd at sub-atmospheric pressure to form cheese.

11. Apparatus as claimed in claim 10, comprising superimposed upper and lower chambers, the lower end of the upper chamber opening into the interior of the lower chamber, means for evacuating air from the two chambers, a movable platform positioned in the lower chamber below the opening between the two chambers, and means for raising and lowering the platform, wherein said column is mounted in the upper chamber and above the opening between the two chambers, said slide valve comprises a guillotine blade adapted, when in the closed position, to seal off the upper chamber from the lower chamber, and said means for introducing crumbled curd into the column is mounted in the top of the upper chamber so as to drop curd into the column and form a pillar of curd therein supported on the slide valve in the closed position, whereby movement of the blade into the open position permits the pillar of curd to slide down the column onto the platform in the lower chamber, subsequent movement of the blade into the closed position severs a block of curd from the lower end of the pillar of curd, and upward movement of the platform compresses the block of curd against the underside of the blade, and an air-tight door in said lower chamber for removing the block of cheese therefrom.

12. Apparatus as claimed in claim 11, wherein the column is formed of perforated sheets, at least the unperforated portions of which are spaced from the wall of the upper chamber to provide a space for drainage of whey expresed from the curd.

13. Apparatus as claimed in claim 11, wherein the means for introducing crumbled curd into the upper chamber comprises a hopper, an air lock duct between the outlet of the hopper and the chamber, two slide valves operable to open and close opposite ends of the air lock duct, and control means adapted automatically to open and close the two valves alternately when the top of the pillar of curd is below a predetermined level.

14. Apparatus as claimed in claim 13, wherein the hopper comprises a funnel and a tubular outlet aligned with the air lock duct and having a length at least equal to that of the air lock duct.

15. Apparatus as claimed in claim 13, wherein each slide valve comprises a metal plate slidable between the two layers of plastics material enclosed in a metal housing.

16. Apparatus as claimed in claim 10, including an outlet duct opening transversely into the lower end of the column, an extrusion nozzle on the outer end of said duct, a guillotine blade movable between a closed position sealing the mouth of the nozzle and an open position in which it is withdrawn clear of the mouth, a reciprocable ram movable transversely of the column between a closed position in which the ram projects as a close sliding fit in the duct and an open position in which the ram is withdrawn from the duct, the ram forming said slide valve adapted to support a pillar of curd in said column, and means operable to move the ram into the open position to permit the pillar of curd to slide down the column so that the lower end of the pillar is in front of the ram, and to move the ram toward the closed position so as to sever a block of curd from the lower end of the pillar, introduce the block into the duct, compress the curd in said duct against the guillotine blade when in the closed position, and extrude the compressed curd when the guillotine blade is subsequently moved into the open position.

17. Apparatus as claimed in claim 16, wherein the outlet duct is fitted with a perforated lining co-operating with the wall of the duct to form passages for drainage of whey expressed from the curd.

18. Apparatus as claimed in claim 16, wherein the extrusion nozzle has a portion tapering in the direction of flow towards the mouth, the tapering portion effecting a further compression of the curd during its flow along the nozzle.

References Cited
UNITED STATES PATENTS

| | | | |
|---|---|---|---|
| 609,728 | 8/1898 | Bolinski | 1119—51.11 |
| 2,272,954 | 2/1942 | Sartori | 31—46 |
| 2,422,895 | 6/1947 | Habenicht | 100—50 |
| 2,768,572 | 10/1956 | Drangle | 99—243 |
| 2,851,776 | 9/1958 | Czulak et al. | 31—46 |
| 3,041,153 | 6/1962 | Elder et al. | 31—89 |
| 3,078,169 | 2/1963 | McCadom | 99—116 |
| 3,140,185 | 7/1964 | Pinckney | 99—116 |
| 3,154,002 | 10/1964 | Budahn | 99—243 |
| 3,164,860 | 1/1965 | Oxel | 18—5 |
| 3,242,571 | 3/1966 | Langford | 31—44 |

ALDRICH F. MEDBERY, Primary Examiner

U.S. Cl. X.R.

18—12; 31—46; 99—243